United States Patent [19]
Clinch et al.

[11] Patent Number: 5,593,263
[45] Date of Patent: Jan. 14, 1997

[54] SNAP-IN FASTENER

[75] Inventors: James P. Clinch, Farmington Hills, Mich.; Michael Danby, Stoney Creek, Canada

[73] Assignee: Eaton Corporation, Cleveland, Ohio

[21] Appl. No.: 489,204

[22] Filed: Jun. 9, 1995

[51] Int. Cl.⁶ .................................................. F16B 37/04
[52] U.S. Cl. ........................... 411/182; 411/173; 411/508
[58] Field of Search .................................... 411/508, 509, 411/172–176, 182

[56] References Cited

U.S. PATENT DOCUMENTS

| | | | |
|---|---|---|---|
| 3,315,721 | 4/1967 | Koehl | 411/173 |
| 3,645,311 | 2/1972 | Tinnerman | 411/173 |
| 3,727,271 | 4/1973 | Znamirowski | 411/508 |
| 4,606,688 | 8/1986 | Moran | 411/182 |
| 4,906,152 | 3/1990 | Kurihara | 411/182 |

*Primary Examiner*—Flemming Saether
*Attorney, Agent, or Firm*—Albert E. Chrow

[57] ABSTRACT

A snap-in type fastener (100) is provided that is adapted to have an object such as automobile trim (24) secured hereto by a threaded member such as a screw (26) and which features a pair of opposed resilient fingers (14, 14') having a contoured cross-section enabling them to flatten as they are pressed into an aperture (32) in a panel (30) until free-ends (17,17') respectively of tabs (16,16') extending respectively therefrom spring or snaps outwardly to engage the opposite side of panel (30) to lockingly secure fastener 100 (and trim 24) to panel (30) while enabling fingers (14,14') to resume their original contoured cross-sectional configuration.

4 Claims, 2 Drawing Sheets

SNAP-IN FASTENER

INTRODUCTION

This invention relates generally to a snap-in fastener adapted to secure an object to a panel or the like and more particularly to a snap-in fastener having an opening therethrough adapted to enable an object to be secured thereto by a threaded member and having a pair of resilient fingers adapted to flatten as they are pressed into a panel aperture in addition to having respective tabs adapted to lockingly secure the fastener to the panel and having respective free-ends adapted so as not to engage the threaded member securing the object to the fastener.

BACKGROUND OF THE INVENTION

Snap-in type fasteners are well known in the art and are useful for securing objects such as trim to a panel such as a vehicular body panel.

Examples of snap-in type fasteners adapted for threaded engagement with a threaded member and assigned to the assignee of the present invention are respectively disclosed in U.S. Pat. Nos. 5,108,239; 4,606,688; and 4,595,325, the disclosures of which are incorporated herein by reference.

Example of snap-in type fasteners not adapted for threaded engagement with a threaded member and assigned to the assignee of the present invention are disclosed in U.S. Pat. Nos. 5,036,567 and 4,683,622, the disclosures of which are incorporated herein by reference.

Another example of a snap-in fastener adapted for engagement with a threaded member is disclosed in U.S. Pat. No. 5,186,517, the disclosure of which is incorporated herein by reference.

An advantage of the snap-in fastener of the present invention is the provision of one or more prongs adapted to penetrate and inhibit rotation of the object to be secured to the panel relative the fastener as well as having a pair of resilient fingers having respective tabs adapted to lockingly secure the fastener to a panel or the like in combination with respective free-ends adapted so as not to engage a threaded member securing the object to the fastener.

The fingers of snap-in fastener are further preferably provided with a cross-section contoured to cause the fingers to flatten as they are pressed into an opening in a panel or the like to which the fastener is to be secured and then resume their original contoured configuration upon being lockingly secured thereto by the tabs.

SUMMARY OF THE INVENTION

Accordingly, it is an object of this invention to provide a snap-in fastener operative to be lockingly secured to a panel or the like.

It is another object of this invention to provide a snap-in fastener operative to be lockingly secured to a panel or the like and have an object secured thereto by a threaded member.

It is still another object of this invention to provide a snap-in fastener having a pair of resilient fingers having respective cross-sections contoured such that the fingers flatten upon being pressed through an aperture in a panel or the like and thence resume their original contoured configuration upon being lockingly secured to a panel in the like by a tab respectively extending from each finger.

DESCRIPTION OF SOME PREFERRED EMBODIMENTS

Figure 1:
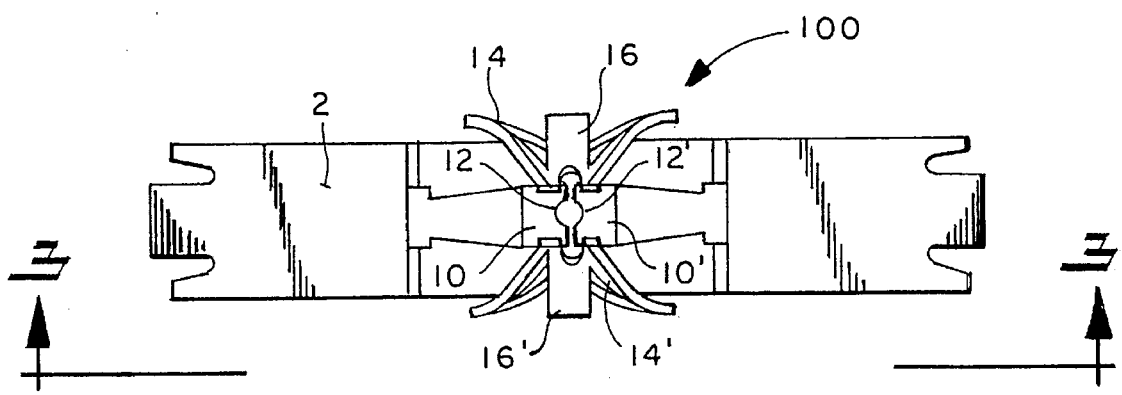
FIG. 1 is a top elevational view of an embodiment of the snap-in fastener of the invention referenced by numeral 100.

A preferred embodiment of the snap-in fastener of the invention is referenced by numeral 100 in FIG. 1. Fastener 100 has a base member 2 that although preferably has a rectangular shape is shown in the FIGURES may have any configuration suitable for a particular application.

Figure 2:
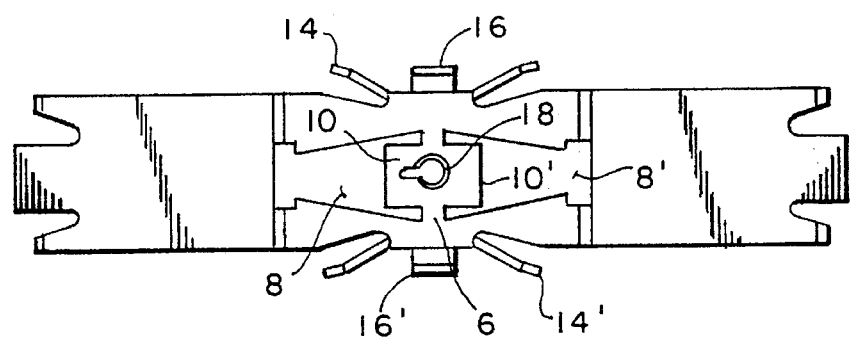
FIG. 2 is a bottom elevational view of fastener 100 of FIG. 1.

The central region of base member 2 has a substantially "H" like configuration best shown in the bottom view in FIG. 2 in which a bridging member 6 extends between openings 8 and 8' to define an "H" like configuration.

An opening 18 having a warped helical edge is provided through bridging member 6. Opening 18 is adapted to threadingly receive a threaded fastener therethrough from the one side of base member 2 such as screw 26 shown in FIG. 5.

Also shown in FIG. 1 are resilient arms 10 and 10' that extend from bridging number 6 on opposite sides of opening 18 and end at facing spaced-apart free ends 12 and 12' in overhanging relationship to opening 18 and respectively configured to threadingly engage a threaded member received therethrough from opening 18.

Figure 3:
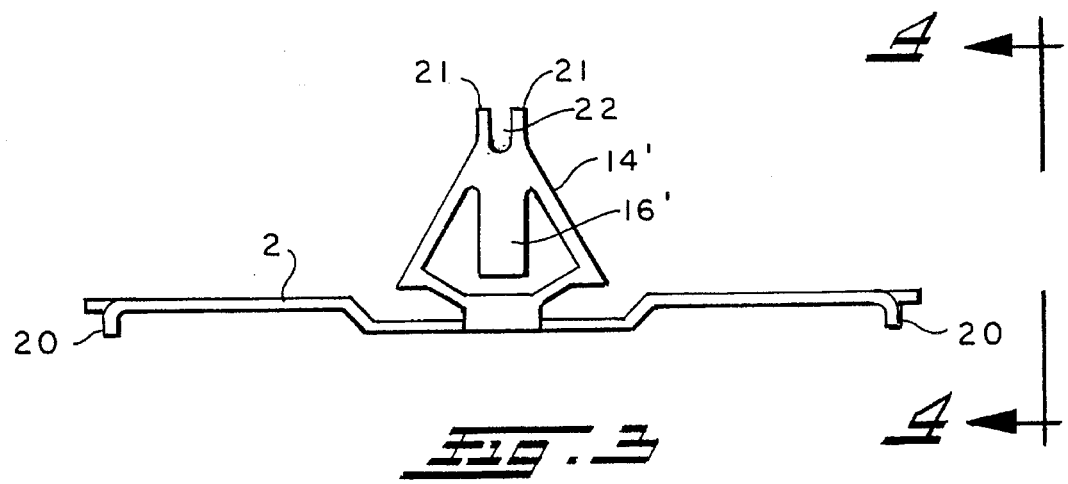
FIG. 3 is a side elevational view of fastener 100 taken along view line 3—3 in FIG. 1.
Figure 4:
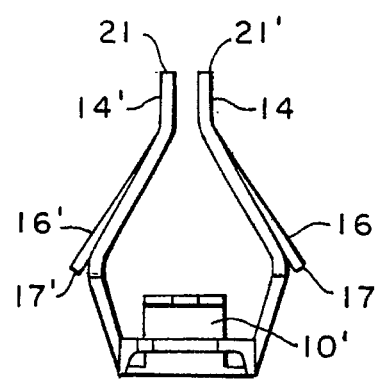
FIG. 4 is an end elevational view of fastener 100 taken along view line 4—4 in FIG. 3.

A pair of resilient fingers 14 and 14' extend from base number 2 on opposite sides of opening 18 in generally transverse relationship to arms 10 and 10' in overhanging relationship thereto and end at respective free-ends 21 and 21' as shown in FIGS. 3 and 4.

Figure 5:
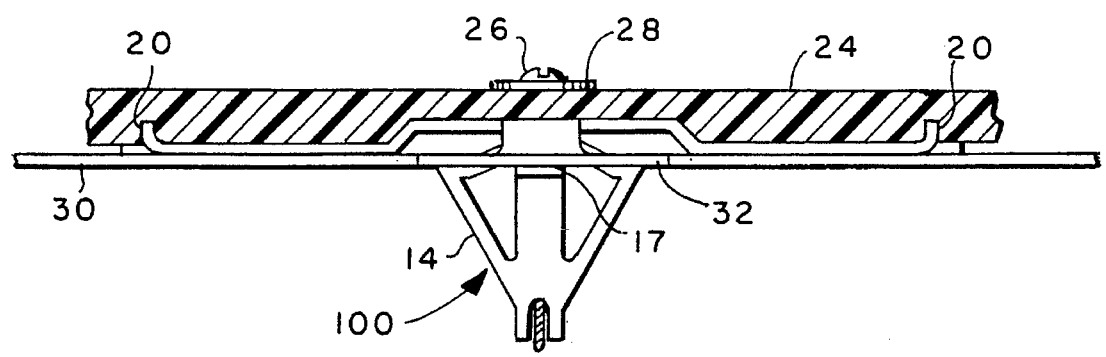
FIG. 5 is a side elevational view of fastener 100 in an inverted position from FIG. 3 securing an object 24 to a plate 30 by means of a threaded member 26.

As shown in the FIGURES, fingers 14 and 14' have a contoured cross-section, such as a gull-wing like cross-section, that enables them to flatten which being pressed between opposite edges of a panel aperture such as aperture 32 in panel 30 shown in FIG. 5.

Fingers 14 and 14' include tabs 16 and 16' that extend in a direction towards base member 2 and end in respective free-ends 17 and 17' as shown in FIG. 4. Tabs 16 and 16' are compressed towards each other as fastener 100 is pressed into the panel aperture while fingers 14 and 14' flatten until tab ends 17 and 17' clear the opposite side of the panel at which point they snap or spring outwardly to lockingly secure fastener 100 to the panel while fingers 14 and 14' resume their original contoured cross-sectional configuration.

As shown in FIG. 2, the free-ends of fingers 14 and 14' are adapted so as not to engage or otherwise interfere with the threaded member being rotationally advanced through opening 18 and between free-ends 12 and 12' of arms 10 and 10' respectively.

Preferably free-ends 21 and 21' are provided with a "U" shaped trough referenced by numeral 22 in FIG. 3 that has a breadth greater than the breadth (outer diameter) of the threaded member such as screw 26 shown in FIG. 5.

Base member 2 of fastener 100 is also provided with means for inhibiting the object to be secured to a fastener 100 from rotating relative thereto. Preferably the means for inhibiting rotation is provided by one or more prongs 20 shown in FIG. 3 that extends away from the one see of base member 2 and our able to penetrate the object.

One example of how the fastener of the invention can be used to advantage is shown in FIG. 5 in which an object such as rubber trim 24 has been secured to fastener 100 by screw 26 that may include a washer 28. Prongs 20 have penetrated trim 24 to prevent it from rotating relative fastener 100. Resilient arms 14 and 14' have then been pressed through opening 32 in panel 30 until free-ends 17 and 17' of tabs 16 and 16' spring outwardly away from each other to engage the opposite (bottom) side of panel 30 to lockingly secure fastener 100 (and trim 24) to panel 30.

Figure 6A:
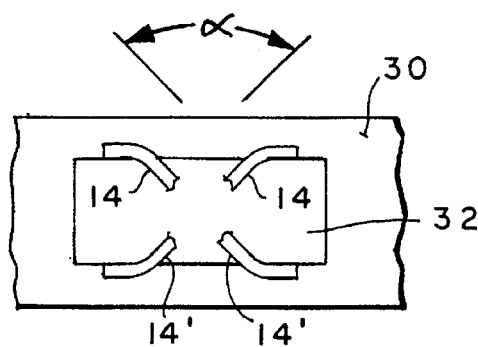
FIGS. 6A and 6B are schematic drawings showing the flattening of fingers 14 and 14' as fastener 100 is pressed into an aperture 32 in panel 30.
Figure 6B:
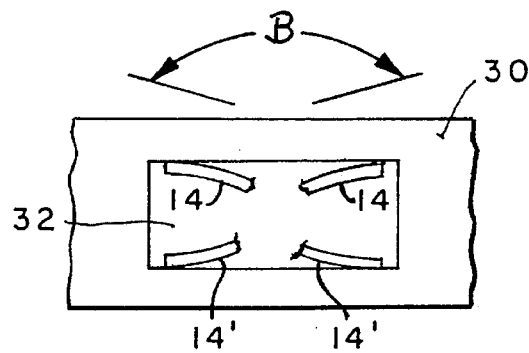

As earlier described, the flattening of fingers 14 and 14' is schematically shown in FIGS. 6A and 6B. In FIG. 6A (before being compressed between opposite edges of aperture 32) fingers 14 and 14' have their original (gull-wing like) cross-sectional configuration having an included angle of alpha (D) and when pressed into aperture 32 (before reaching the opposite side of panel 30) they are respectively flattened and respectively have the greater included angle beta (3) shown in FIG. 6B.

The fastener of the invention may be made from any suitably resilient metal or plastic or composite material such as a suitable spring steel having the properties required for the particular application involved.

What is claimed is:

1. A snap-in fastener, said fastener having a base number having a central portion having a substantially H-shaped configuration defined by a bridging member extending between a pair of openings through the base member, means on one side of the base member for inhibiting rotation of the fastener relative an object to be secured to a panel thereby, an opening through the bridging member surrounded by a warped helical edge adapted to threadingly engage a threaded member received thereunto from the base member, a pair of resilient arms respectively disposed on opposite sides of the bridging member opening, said arms respectively extending away from the base member and ending at respective spaced-apart free-ends in overhanging relationship to the bridging member opening, said free-ends respectively adapted to engage threads of the threaded member received through the bridging member opening for securing the object to the fastener, a pair of resilient fingers respectively disposed on opposite sides of the bridging member opening in substantial transverse relationship to the arms, said fingers respectively extending away from the base member and ending at respective spaced apart free-ends facing away from the base member in overhanging relationship to the arms, each of said fingers having a resilient tab extending therefrom and ending in a free-end facing toward the base member, said tabs respectively adapted to engage opposite edges of an aperture in the panel and compress towards each other upon receipt of the fingers thereunto and thence spring outwardly away from each other upon passage of said free-ends through the panel aperture and lockingly secure the fastener to the panel, and each of said finger free-ends respectively adapted not to engage the threaded member received through the base member opening for securing the object to the fastener.

2. The fastener of claim 1 wherein the means for inhibiting rotation of the fastener relative the object comprises at least one prong extending away from said one side of the base member and adapted to penetrate the object upon being pressed thereagainst.

3. The fastener of claim 1 wherein the finger free-ends are adapted not to engage the threaded member by having respective "U" shaped troughs disposed therein having a breadth greater than the breadth of the threaded member.

4. The fastener of claim 1 wherein the fingers have respective cross-sections contoured to cause the fingers to flatten as the fingers are received through the panel member aperture and thence resume their original cross-sectional contoured configuration upon the fastener being lockingly secured to the panel by the tabs.

\* \* \* \* \*